United States Patent [19]

Onley

[11] Patent Number: 4,464,349
[45] Date of Patent: Aug. 7, 1984

[54] METHOD AND APPARATUS FOR THE REMOVAL OF CARBON MONOXIDE FROM THE EXHAUST DISCHARGES OF SMALL INTERNAL COMBUSTION ENGINES

[76] Inventor: John H. Onley, 6809 Robinia Rd., Temple Hills, Md. 20748

[21] Appl. No.: 408,787

[22] Filed: Aug. 17, 1982

[51] Int. Cl.³ .............................................. B01D 53/34
[52] U.S. Cl. ................................ 423/213.2; 423/247; 502/225; 252/189
[58] Field of Search ................ 423/212, 212 C, 213.2, 423/247; 252/441, 476, 189, 190; 502/225, 345

[56] References Cited
U.S. PATENT DOCUMENTS
3,787,328  1/1974  Deline ............................... 423/213.2

Primary Examiner—Earl C. Thomas
Assistant Examiner—Jeffrey E. Russel

[57] ABSTRACT

The method of this invention entails reducing the carbon monoxide content in the exhaust discharges of small internal combustion engines. The exhaust discharges are passed over an amalgamated block consisting of cuprous chloride and tricalcium silicate; the cuprous chloride serves as the active ingredient. The underlining principle is that carbon monoxide in the exhaust discharges reacts with cuprous chloride whereas an addition product is formed ($CuCl.CO.H_2O$). The invention also includes a housing into which the amalgamated block is situated.

1 Claim, 1 Drawing Figure

METHOD AND APPARATUS FOR THE REMOVAL OF CARBON MONOXIDE FROM THE EXHAUST DISCHARGES OF SMALL INTERNAL COMBUSTION ENGINES

BACKGROUND OF THE INVENTION

A detailed patent search has shown that prior inventors (U.S. Pat. Nos.: 2,974,150—3/1961—Mc Clements et al ... 252/477R and 3,939,104—2/1976—Campbell et al ... 423/213.5) have concentrated their energies and thoughts on means by which to remove carbon monoxide and other noxious substances from the exhaust of large combustion engines; most of the data that have been compiled involved experimentation on the exhaust fumes from the automobile. One is therefore justified in saying that the problems of air pollution have been looked at in depth with regards to non-restricted open areas such as a whole community, a city, etc. However, efforts to remove carbon monoxide and other noxious substances from the exhaust fumes of small internal combustion engines operating in close proximity to workers have been lacking. The present invention was inspired by the preceding fact, and its present scope takes into consideration the reduction of carbon monoxide from the exhaust fumes of small internal combustion engines contained in equipment such as those used for lawn and garden care. Carbon monoxide, an extremely poisonous compound, *even in very low concentration* in open working areas may cause uncomfortable body symptoms.

BRIEF DESCRIPTION OF THE DRAWING

The overall invention including the amalgamated block situated in a cylindrical housing is illustrated in the single accompanying drawing.

DESCRIPTION OF THE PREFERRED EMBODIMENT

Figure 1:
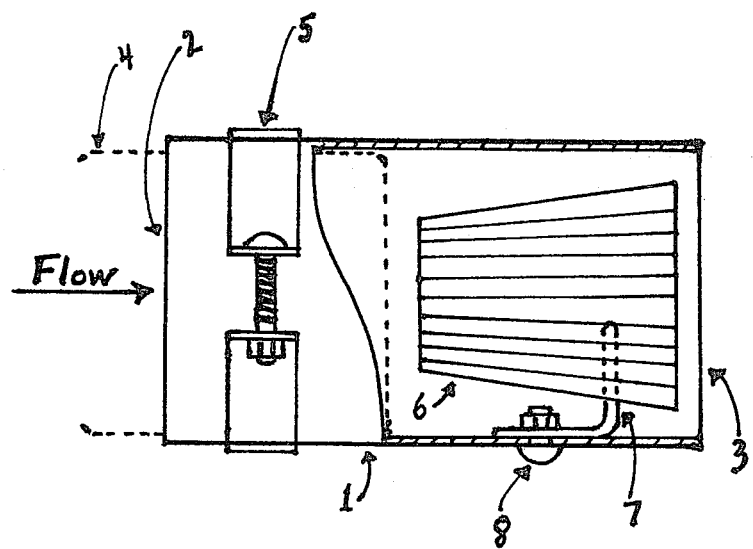
In FIG. 1, an elongated cylindrical housing 1 made of non-corrodible sheet metal has two openings 2 and 3. Opening 2 is fitted over the muffler 4 of a small internal combustion engine by means of a clamp 5. The amalgamated block 6 (cuprous chloride:tricalcium silicate) is held in the exhaust stream by a clip 7 which is secured to the metal housing by a metal screw 8.

Cuprous chloride, a white powder which may turn light green when exposed to air over a long period, is used in the analytical laboratory as the most effective means by which to determine the amount of carbon monoxide in gases. The present invention involves means by which the powdery cuprous chloride is amalgamated with tricalcium silicate so that exhaust discharges from combustion engines can make adequate surface contact and yet there is no reduction in the overall performances of the combustion engines.

More precisely, the amalgamated block in this invention comprises of the active ingredient cuprous chloride and tricalcium silicate at about a 4:6 ratio, respectively. It is situated in the aforementioned cylinder 1 housing whereas the carbon monoxide in the hot exhaust continuously reacts very readily with the cuprous chloride.

The subject device was connected over the muffler of a 3-year old 4 HP Briggs & Stratton engine. Comparative tests were carried out with a control block containing no cuprous chloride and with amalgamated blocks containing cuprous chloride. The results are given below:

|  | Grams of CO removed from exhaust discharge at the end of: | | |
| --- | --- | --- | --- |
|  | 20 min. | 40 min. | 60 min. |
| Control Amalgamated blocks | 0.005 | 0.007 | 0.007 |
| #1 | 0.625 | 0.767 | 0.908 |
| #2 | 0.711 | 0.790 | 0.901 |
| #3 | 0.657 | 0.710 | 1.067 |

As the above results show, an amalgamated block containing cuprous chloride as an active ingredient is an effective scrubber for removing carbon monoxide from the exhaust discharge of small internal combustion engines.

What is claimed is:

1. A method of reducing the carbon monoxide content of garden and lawn equipment powered by small internal combustion engines which consists of contacting said exhaust gases, prior to discharge thereof to the surrounding atmosphere, with cuprous chloride amalgamated with tricalcium silicate.

* * * * *